United States Patent [19]

Ludwig

[11] 4,048,394
[45] Sept. 13, 1977

[54] SECONDARY BATTERY OR CELL WITH VITREOUS CARBON COATED GRAPHITE CURRENT COLLECTOR

[75] Inventor: Frank A. Ludwig, Southfield, Mich.

[73] Assignee: Ford Motor Company, Dearborn, Mich.

[21] Appl. No.: 772,618

[22] Filed: Feb. 28, 1977

[51] Int. Cl.² ............................................ H01M 10/39
[52] U.S. Cl. .................................... 429/104; 429/109
[58] Field of Search .................. 429/104, 101–103, 429/191, 218, 233, 245, 209, 31, 122; 427/228

[56] References Cited

U.S. PATENT DOCUMENTS

| | | | |
|---|---|---|---|
| 3,854,979 | 12/1974 | Rossi | 427/228 |
| 3,982,957 | 9/1976 | Jones et al. | 429/104 X |
| 3,993,503 | 11/1976 | Ludwig | 429/103 |
| 4,011,367 | 3/1977 | Evans et al. | 429/104 |

*Primary Examiner*—Anthony Skapars
*Attorney, Agent, or Firm*—Roger L. May; Keith L. Zerschling

[57] ABSTRACT

An improved secondary battery or cell of the type having: (A) an anodic reaction zone containing a molten alkali metal reactant-anode in electrical contact with an external circuit; (B) one or more cathodic reaction zones containing a cathodic reactant which, when said battery or cell is at least partially discharged, is selected from the group consisting of (i) a single phase composition comprising molten polysulfide salts of said anodic reactant and (ii) a two-phase composition comprising molten sulfur and molten sulfur saturated polysulfide salts of said anodic reactant; (C) a cation-permeable barrier to mass liquid transfer interposed between and in contact with said anodic and cathodic reaction zones; and (D) a current collector which at least partially exposed to said cathodic reactant and which is in electrical contact with both said cation-permeable barrier and said external circuit. The improvement comprises employing in said device a current collector comprising a graphite body bearing a coating of vitreous carbon on at least those surfaces thereof which are exposed to said cathodic reactant.

15 Claims, 3 Drawing Figures

SECONDARY BATTERY OR CELL WITH VITREOUS CARBON COATED GRAPHITE CURRENT COLLECTOR

The invention herein described was made in the course of or under a contract or subcontract thereunder with the National Science Foundation.

This application relates to an improved secondary battery or cell.

More particularly, this application relates to an improved secondary battery or cell of the type comprising a molten alkali metal anode, a cathode containing a liquid electrolyte electrochemically reversibly reactive with said alkali metal, a cation-permeable barrier to mass liquid transfer interposed between and in contact with said anode and said liquid electrolyte and a current collector in electrical contact with said cation-permeable barrier and said external circuit.

This application still more particularly relates to an improved sodium sulfur battery or cell.

BACKGROUND OF THE INVENTION

A recently developed type of secondary battery or rechargeable electrical conversion device comprises: (1) an anodic reaction zone containing a molten alkali metal anode-reactant, e.g., sodium, in electrical contact with an external circuit; (2) a cathodic reaction zone containing a cathodic reactant comprising a liquid electrolyte, e.g., sulfur or a mixture of sulfur and molten polysulfide, which is electrochemically reversibly reactive with said anodic reactant; (3) a solid electrolyte comprising a cation-permeable barrier to mass liquid transfer interposed between and in contact with said anodic and cathodic reaction zones; and (4) a current collector which is in electrical contact with both said cation-permeable barrier and said external circuit. As used herein the term "reactant" is intended to mean both reactants and reaction products.

One of the primary problems which must be overcome before the alkali metal/sulfur cells or batteries of the above type become commercially feasible involves materials. In particular, that problem involves the selection of current collector and/or container or liner materials which will be stable in corrosive polysulfide salts generated during discharge of the cell or battery. While metals are likely candidates for use as current collectors and/or containers or liners since they are conductive and nonporous, they tend to corrode in the presence of polysulfide salts. Graphite, on the other hand, is fairly noncorrodable in polysulfide metals and is conductive, but is porous to the melt and gases generated during operation of the cell and tends to oxidize in the presence of air.

It is an object of this invention to provide an improved battery or cell of the above type wherein the current collector and/or container or liner is not only conductive and noncorrosive as in the case of graphite, but is also nonporous as in the case of metals.

BRIEF DESCRIPTION OF THE INVENTION

This object and other more detailed objects which will be apparent to those skilled in the art are accomplished by the improvement of this invention which comprises employing as the current collector and/or container or liner of the cell or battery a composite comprising a shaped graphite body bearing a coating, preferably from about 5 to about 10 microns in thickness, of vitreous carbon on at least those surfaces thereof which are exposed to said cathodic reactant during the operation of the cell. More particularly, the invention involves employing graphite bodies which are also impregnated with said vitreous carbon to a depth of between about 1 and about 10 mils.

Although the coated and impregnated body may serve solely as the current collector for such a battery or cell, it is also suited to serve as a current collector liner or a current collector/container. In a preferred embodiment, the cathodic reaction zone also contains a porous electrode and the contact between the porous electrode and the current collector/container or liner is effected by a vitreous carbon bond.

The invention will be more fully understood after reading the following detailed description thereof in conjunction with the drawings in which:

FIG. 1 shows a vertical sectional view of the cell to which the improvement of this invention may be applied and FIGS. 2 and 3 show the exemplary cross-sectional views of such a cell.

DETAILED DESCRIPTION OF THE INVENTION

Figure 1:
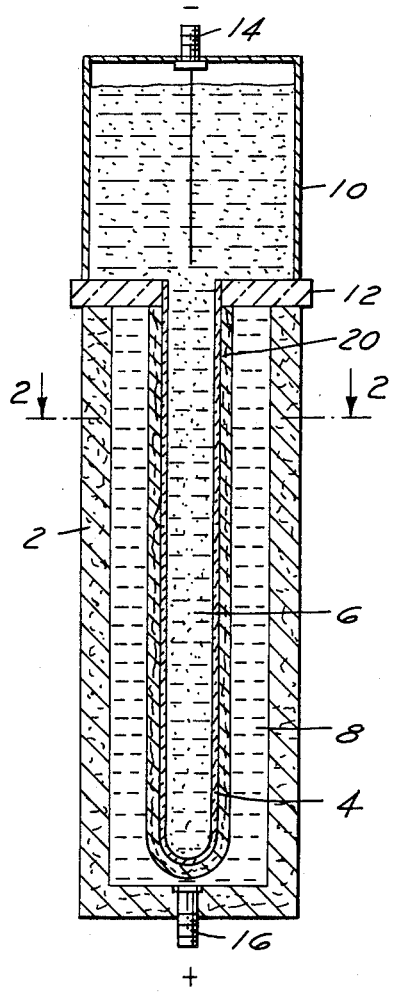

Description of Device to Which Improvement Applies

The secondary or rechargeable electrical conversion devices to which the improvement of this invention applies and various components thereof are well known to those skilled in the art and are disclosed in a number of patents including the following: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; 3,811,493; 3,951,689; 3,966,492; 3,976,503; 3,980,496; 3,985,575; 3,985,576; 3,993,503; 3,994,745; 4,002,806; and 4,002,807.

As mentioned above, the type of secondary battery or cell to which the improvement of this invention applies generally comprises: (1) an anodic reaction zone containing a molten alkali metal-anode in electrical contact with an external circuit; (2) a cathodic reaction zone containing a cathodic reactant comprising a liquid electrolyte selected from sulfur or a mixture of sulfur and sulfur saturated polysulfide salts of said molten alkali metal reactant which are electrochemically reversibly reactive with said anodic reactant; (3) a cation-permeable barrier to mass liquid transfer interposed between and in contact with said anodic and cathodic reaction zones; and (4) a current collector which is at least partially exposed to said cathodic reactant.

The anodic reactant employed in such device is an alkali metal which is maintained above its melting point when the device is in operation. The anodic reactant is heated by any conventional means including, but not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor it is also undergoing an electrochemical reaction. Molten sodium is employed as the anodic reactant in the most preferred embodiments of such devices. However, potassium, lithium and other alkali metals mixtures of such alkali metals, or alloys containing such alkali metals may be used. It will be recognized by those skilled in the art that certain alkali metals are better suited for use in conjunction with particular cation-permeable barriers.

The cathodic reactant is a molten material, e.g., molten sulfur, which is electrochemically reversibly reactive with the anodic reactant. As the device begins to discharge, the mole fraction of elemental sulfur drops while the open cell voltage remains constant. During this portion of the discharge cycle, as the mole fraction of sulfur drops from 1.0 to approximately 0.72 the cathodic reactant displays two phases, one being essentially pure sulfur and the other being sulfur saturated alkali metal polysulfide in which the mole ratio of sulfur to alkali metal is about 5.2:2. When the device is discharged to the point where the mole fraction of sulfur is about 0.72, the cathodic reactant becomes one phase in nature since all elemental sulfur has formed polysulfide salts. As the device is discharged further, the cathodic reactant remains one phase in nature and as the mole fraction of sulfur drops, so does the open circuit voltage corresponding to the change in the potential determining reaction. Thus, the device continues to discharge from a point where polysulfide salts contain sulfur and alkali metal in a mole ratio of approximately 5.2:2 to the point where polysulfide salts contain sulfur and alkali metal in a ratio of about 3:2. At this point the device is fully discharged.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic rectant during operation of the device. The cathodic reactant together with the separator provides a sufficient barrier to free electron flow in the internal portion of the electrical circuit to permit a difference of potential to develop at the respective electrodes of the device in operation. It is preferred that the separator be as thin as possible without unduly sacrificing strength. Although optimum thickness may vary with intended use, separators having a thickness in the range of about 20 to about 2000, preferably about 100 to about 1000, microns have been found to be effective.

Both glass and polycrystalline ceramic materials have been found suitable for use in such devices as the cation-permeable barrier or reaction zone separator. The various glasses which are suitable as cation-permeable barriers are described in many of the aforementioned patents. The glasses disclosed therein may be prepared by conventional glass making procedures using the ingredients described therein and firing at temperatures of about 2700° F.

The polycrystalline ceramic materials useful as cation-permeable barriers are bi- or multi-metal oxides. Such materials are described in a number of the aforementioned patents. Among the most preferred of these materials are those in the family of beta-type alumina, all of which exhibit a generic crystalline structure which is readily identifiable by x-ray diffraction. Thus, beta-type alumina or sodium beta-type alumina is a material which may be thought of as a series of layers of aluminum oxide held apart by columns of linear Al—O bond chains with sodium ions occupying sites between the layers and columns. Among the numerous useful polycrystalline beta-type-alumina materials are: (1) standard beta-type alumina; (2) boron oxide ($B_2O_3$) modified beta-type alumina; (3) substituted beta-type-alumina; and (4) beta-type alumina which is modified by the addition of a minor proportion by weight of metal ions having a valence not greater than 2.

The devices to which the improvement of this invention applies may also include a cathodic electrode or porous conductive material which is in electrical contact with the cation-permeable barrier and the external circuit via the current collector. The conductive material is of significantly greater surface area than a solid cathode and may comprise any porous material which is electronically conductive and which is resistant to attack by reactants within the cathodic reaction zone. Among the many materials which may be employed are felts or foams of graphite or vitreous carbon.

While the secondary cells or batteries to which the improvement of the invention is applicable may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create a first reaction zone within said and a second reaction zone between said barrier and said container; (3) a molten alkali metal anode reactant within the anodic reaction zone, which is typically the first reaction zone formed within the cation-permeable barrier; (4) a cathodic reactant comprising a liquid electrolyte which is electrochemically reversibly reactive with said anodic reactant and which, at least in the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant disposed in a cathodic reaction zone, which is typically the second reaction zone formed between said container and said cation-permeable barrier.

IMPROVEMENT OF THE INVENTION

As generally discussed above, the improvement of this invention involves use of a graphite body bearing a coating of vitreous carbon as the current collector or a current collector/container or current collector/liner in the secondary battery or cell of the type discussed above, wherein the vitreous carbon coating covers at least those surfaces of said current collector which are exposed to the corrosive polysulfide cathodic reactant during operation of the battery or cell. Generally, the graphite body is not only coated to a thickness of preferably between about 5 and about 10 microns with said vitreous carbon, but is also impregnated with said vitreous carbon to a depth of between about 1 and about 10 mils.

As mentioned above, the vitreous carbon coated impregnated graphite body may serve solely as the current collector in the cathodic reaction zone of the device. Alternatively, it may be used as a current collector/liner disposed internally and in contact with a conductive container, e.g., metal. Still further, it may in certain circumstances serve as a current collector device.

Although tubular vitreous carbon coated bodies prepared in accordance with the invention exhibit excellent radial conductivity, the axial conductivity of such bodies may be considered marginal in all except very short cells. Therefore, it may be desirable in many applications to provide such a current collector or current collector/container with a metal surface such as by plating chromium, nickel or other metals by known means on the surface thereof opposite to the vitreous carbon surface which will be exposed to the cathodic reactant. Since known plating techniques are most successful when the graphite surface to be coated is porous, it is desirable when preparing the vitreous carbon coated graphite body to be plated, to not apply the vitreous carbon coating to the surface which is to be plated. A plate of several mils or more in thickness is sufficient to provide the required axial conductivity.

When the vitreous carbon coated and impregnated body is used as a current collector/liner which is in direct electrical contact with a metal container, the container provides the necessary axial conductively. Good electrical contact may be achieved between the metal and the impregnated body by compressed metal felt or graphite felt. The metal container, a cylinder in a preferred embodiment, may be of various grades of stainless steel or other metals.

In those embodiments of the invention wherein the vitreous carbon coated graphite serves as the current collector/container or as the current collector/liner, a porous electrode disposed within the cathodic reaction zone is also employed and is bonded to said current collector by vitreous carbon, thus making an excellent electrical contact and a good mechanical bond.

Figure 2:
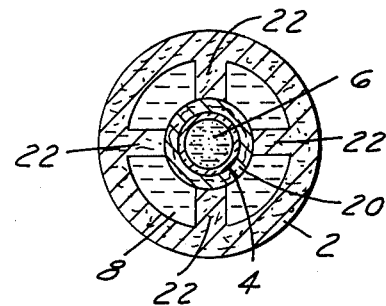
Figure 3:
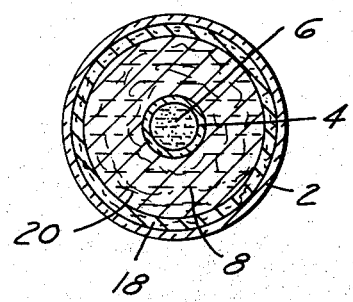

The device shown in FIG. 1 is a representative of the type of battery or cell to which the improvement of this invention may be applied. The various parts of the cell or battery, which are discussed above, include container 2, cation-permeable barrier 4, anodic reactant alkali metal 6 and cathodic reactant 8. Also shown are an alkali metal reservoir 10, which is electrically insulated from said cathodic reaction zone by insulating ceramic header 12, lead 14 from said alkali metal to the external circuit and lead 16 shown in FIG. 1 being connected to the container and leading to said external circuit. Porous electrode 20 is disposed around cation-permeable barrier 4. FIGS. 2 and 3 show examples of cross sections of the type of cells to which the improvements of this invention may be applied. The numerals designate the same parts described above with respect to FIG. 1. FIG. 2 shows one embodiment of the use of the improvement of the invention wherein container 2 also serves as the current collector. The device shown in FIG. 2 in cross section also includes integral arms extending from the container portion of the current collector inwardly toward the cation permeable barrier 4. Also included is a felt electrode 20 to which the arms of the current collector/container are bonded, preferably by vitreous carbon. As noted above, it may be desirable to plate a layer of metal on the exterior of container 2 to provide axial conductivity. Other means of providing axial conductivity, such as by embedding a wire mesh in the graphite body may also be apparent to those skilled in the art.

FIG. 3 shows another embodiment of the invention wherein a separate current collector 18 comprising the vitreous carbon coated graphite body is employed internally of container 2 which may be formed of any material, including an insulating material such as glass. In this embodiment lead 16 would be connected to current collector 18 rather than to the container wall. Also shown between cation-permeable barrier 4 and current collector 18 is a porous felt electrode 20 which completes the electrical connection between the cation permeable barrier and current collector 18.

The Figures illustrate the most preferred symmetry for the cells to which the improvement is applied, i.e., those which are cylindrical or tubular in nature. However, it will be appreciated by those skilled in the art that various cell configurations are suitable for the improvement of the invention. Thus, tubular configurations in which the anodic reactant is disposed in said second reaction zone and the cathodic reactant is disposed within said first reaction zone may be employed. In such an embodiment, the current collector would be disposed internally of the cation-permeable barrier and would not serve as the container. Other configurations, of a non-cylindrical or nontubular nature will also be apparent to those skilled in the art, particularly in view of the disclosures of the various patents cited above.

Vitreous carbon, which is similar to glass in appearance, is a relatively new form of carbon. In vitreous carbon each atom in the diamond lattice is joined by covalent links to four others surrounding it at the corners of a regular tetrahedron, with an inter atomic distance of 1.4A. One of the most striking differences between vitreous carbon and conventional graphite is its extremely low permeability to gases. The value for vitreous carbon obtained by mass spectrometric method using helium, is about 13 orders of magnitude less than that of an electrode graphite; it is comparable to that of hard glasses. Like most forms of carbon, vitreous carbon is inert to a wide range of chemical reagents. However, it is even more inert than others because of its low permeability. Vitreous carbon is prepared generally by thermal degradation of selected organic polymers in accordance with processes which are well known in the prior art. The properties of the char are dependent on the maximum temperature of the heat treatment. General information with respect to vitreous carbon may be found in an article entitled "Vitreous Carbon — A New Form of Carbon" appearing at pages 507–512 of Vol. 2 of the *Journal of Material Science.*

One particularly suitable method for producing vitreous carbon coatings on the graphite bodies used in the improvements of this invention is disclosed in U.S. Pat. No. 3,854,979 issued Dec. 17, 1974 to Ronald C. Rossi. The entire disclosure of that patent is hereby incorporated into this disclosure by reference. The process disclosed therein involves the coating of ceramic oxides, carbon and graphite substrates with a thin, well adhered surface layer of impervious, vitreous or glass carbon glaze. Generally, in accordance with the invention, polyvinyl chloride, polyvinyl fluoride or other natural or synthetic organic substances are decomposed by heating in an inert atmosphere at 375°–410° for 5 to 100 minutes. The decomposition product is dissolved in an aromatic solvent, preferably benzene or toluene. The substrate is then coated in the solution by dipping and baked for about 12 minutes in an inert atmosphere at 800°–1200° C. Repeated coatings may be applied for a thicker carbon glaze. More specifically, the practice of the invention of the Rossi patent involves the selection of a precursor material such as one selected from the group of halogenated linear polymers. Most common of these are in the class of resins such as polyvinyl chloride (PVC). The precursor is heated to a temperature of 350° to 450° C in an inert atmosphere for a time sufficient to decompose it to a hydrocarbon with a C to H mass ratio approximately 12-13 to 1, indicative of a compound with a C:H: atomic ratio of 1:1. The optimal temperature for PVC is approximately 390° C and the time of this temperature is about 5 minutes, minimum, with times in excess thereof having no apparent further reducing effect on the PVC precursor. After this treatment the material is viscous and glossy black. Preparatory to the above process step the PVC is ground to the granularity of sand to assure its thorough decomposition. The residue is allowed to cool and become solidified and will the remain stable under ambient conditions. The residue is ground to a 1-10 micron powder and is made into a slurry by dissolving it in a liquid aromatic solvent such as benzene. The concentration of decomposed PVC in solution is preferably betweeen 200 to 450 grams per liter with the exact concentration varying as function of the surface finish and porosity of the surface to be coated. The slurry is improved by filtering to remove undissolved particles.

The carbon or ceramic article is coated with the slurry by dipping, spraying or brushing. Air drying follows to evaporate the solvent. The article is then placed in an oven the chamber of which is evacuated and back filled with an inert gas such as argon. The oven temperature is raised between 800° and 1200° C at a rate of 30° to 40° per minute. Within 10 to 15 minutes after reaching maximum temperature at the surface of the article a film of glassy carbon is formed thereon. The dipping, drying and curing steps are then repeated one to five more times.

EXAMPLE

An electrical conversion device of the type described above, wherein the container is cylindrical and also serves as the current collector, is prepared. The current collector/container is prepared by forming the graphite by commercially known means into the desired cylindrical shape and impregnating and coating with vitreous carbon in the following manner:

a. Preparation of the Precursor

PVC is ground to the granularity of sand (½ mm.). A quantity of the precursor is placed in a baking chamber which is evacuated and back filled with argon. The temperature within the chamber is elevated at a rate of 15°-20° C per minute to 390° (±5)° C. After curing at about 390° C, the material is a molten, lustrous black, viscous mass that solidifies on cooling. Analysis of the product reveals a composition of more than 99 percent carbon and hydrogen with a mass ratio between 12-13 to 1 indicating its chemical composition as approximately $C_{nHn}$ where $n$ is a whole number.

b. Slurry Blending

The solidified precursor thus prepared is ground to a fineness of 1-10 microns and blended with benzene in concentrations between about 250 and 400 g/liter.

c. Substrate Glazing

The graphite cylinder to be coated with glassy carbon is dipped in the slurry for several minutes to allow the slurry to penetrate its pores. It is then dried to evaporate the solvent. The thus coated article is then baked in an inert atmosphere of argon at a temperature of 800° C or more for approximately 12 to 20 minutes. The dipping and baking is repeated several times until a thickness of vitreous carbon in the range of between about 5 and about 10 microns is obtained.

The resultant vitreous carbon bearing graphite current collector/container is noncorrosive in the presence of the polysulfide salts of the cathodic reaction zone, is impervious to such salts and gases generated in the cathodic reaction zone and is a good conductor of electricity. If a more conductive body is desired, i.e., one with better axial conductivity, the vitreous carbon coating is applied to only the inner surface of the graphite cylinder and the exterior is plated with a metal.

d. Cell Construction

The coated and impregnated cylinder is used to prepare a sodium/sulfur cell in the manner known to those skilled in the art. A graphite felt or vitreous carbon foam electrode is disposed within the cathodic reaction zone between the outer wall of the cation-permeable barrier and the inner wall of the container. If desired, the felt or foam may be bonded to the container by coating that portion of the felt contacting the container with the slurry blend described above followed by baking as described above. The felt or foam may be bonded to the container by organic substances such as polyvinylchloride or polyphenylene resins which are then converted to vitreous carbon.

In view of this disclosure, many modifications of this invention will be apparent to those skilled in the art. It is intended that all such modifications which fall within the scope of this invention be included within the terms of the appended claims.

I claim:

1. A secondary battery or cell of the type comprising: (A) an anodic reaction zone containing a molten alkali metal reactant-anode in electrical contact with an external circuit; (B) a cathodic reaction zone containing a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant; (C) a cation-permeable barrier to mass liquid transfer interposed between and in contact with said anodic and cathodic reaction zones; and (D) a current collector which is at least partially exposed to said cathodic reactant and which is in electrical contact with both said cation-permeable barrier and said external circuit, wherein the improvement comprises:

a current collector comprising a graphite body bearing a coating of vitreous carbon on at least those surfaces thereof which are exposed to said cathodic reactant.

2. A secondary battery or cell in accordance with claim 1 wherein said current collector also serves as the container for the device.

3. A secondary battery or cell in accordance with claim 2 wherein said current collector/container has a plated metal surface which is not exposed to said cathodic reactant and which provides said container with axial conductivity.

4. A secondary battery or cell in accordance with claim 1 wherein said current collector also serves for a liner for the device and is disposed adjacent to and in electrical contact with an axially conductive container.

5. A secondary battery or cell in accordance with claim 1 wherein said graphite body is impregnated with said vitreous carbon.

6. A secondary battery or cell in accordance with claim 5 wherein said graphite body is impregnated with said vitreous carbon to a depth of between about 1 and about 10 mils.

7. A secondary battery or cell in accordance with claim 5 wherein said graphite body bears a coating having a thickness ranging from about 5 to about 10 microns.

8. A secondary battery or cell in accordance with claim 1 wherein a porous electrode is disposed within said cathodic reaction zone and wherein contact between said porous electrode and said current collector is effected by a vitreous carbon bond.

9. A secondary battery or cell in accordance with claim 1 wherein a cylindrical or tubular container has disposed internally thereof a tubular or cylindrical cation-permeable barrier such that a first reaction zone is located internally of said cation-permeable barrier and a second reaction zone is located between the outer wall of said cation-permeable barrier and the inner wall of said container.

10. A secondary battery or cell in accordance with claim 9 wherein said first reaction zone is said anodic reaction zone, said second reaction zone is said cathodic reaction zone.

11. A secondary battery or cell in accordance with claim 10 wherein said current collector also serves as the container for the device.

12. A secondary battery or cell in accordance with claim 11 wherein said current collector/container has a plated surface which is not exposed to said cathodic reactant and which provides said container with axial conductivity.

13. A secondary battery or cell in accordance with claim 10 wherein said current collector also serves as a liner for the device and is disposed internally of and in electrical contact with an axially conductive container.

14. A secondary battery or cell in accordance with claim 10 wherein said current collector is impregnated with vitreous carbon to a depth of between about 1 and about 10 mils.

15. A secondary battery or cell in accordance with claim 14 wherein said coating on said current current collector is between about 5 and about 10 microns in thickness.

* * * * *